(12) United States Patent
Goodger

(10) Patent No.: US 7,086,352 B2
(45) Date of Patent: Aug. 8, 2006

(54) DOOR SUSPENDED OUTWARD FACING BIRD PERCH

(76) Inventor: John Goodger, 7 Minti Rd., Coram, NY (US) 11727

( * ) Notice: Subject to any disclaimer, the term of this patent is extended or adjusted under 35 U.S.C. 154(b) by 0 days.

(21) Appl. No.: 10/841,600

(22) Filed: May 7, 2004

(65) Prior Publication Data

US 2005/0263094 A1    Dec. 1, 2005

(51) Int. Cl.
*A01K 31/12* (2006.01)
(52) U.S. Cl. ...................................... 119/537
(58) Field of Classification Search ............... 119/464, 119/468, 57.8, 459, 537, 531, 705, 708, 495; D30/119; 211/16, 119.004, 88.04; D6/512
See application file for complete search history.

(56) References Cited

U.S. PATENT DOCUMENTS

| | | | |
|---|---|---|---|
| 1,542,181 A * | 6/1925 | Sherman | 211/119.004 |
| D103,963 S * | 4/1937 | Butler | 119/464 |
| D132,711 S * | 6/1942 | Sanford | 211/16 |
| 2,504,282 A | 4/1950 | Tobias | 119/51 |
| 2,539,348 A * | 1/1951 | Gass | 119/468 |
| 2,582,095 A * | 1/1952 | Bergeron | 119/531 |
| 2,655,268 A * | 10/1953 | Whaley | 211/88.04 |
| 2,707,936 A * | 5/1955 | Kiehl | 119/468 |
| 3,138,139 A | 6/1964 | Good | 119/26 |
| 4,627,384 A | 12/1986 | Courteau | 119/26 |
| D292,334 S | 10/1987 | Courteau | D30/42 |
| 5,218,927 A | 6/1993 | Addams | 119/26 |
| 5,474,032 A | 12/1995 | Krietzman et al. | 119/708 |
| 5,505,317 A * | 4/1996 | Rulis et al. | 211/119.004 |
| 5,511,511 A * | 4/1996 | Voren | 119/464 |
| 5,632,230 A | 5/1997 | Dornetta | 119/537 |
| D384,442 S | 9/1997 | Cirelli | D30/119 |
| D386,834 S | 11/1997 | Nissim et al. | D30/119 |
| D400,314 S | 10/1998 | Nicolai et al. | D30/119 |
| 5,829,390 A | 11/1998 | Jonilla | 119/706 |
| 5,875,902 A * | 3/1999 | Emery et al. | 211/119.004 |
| D414,901 S | 10/1999 | Cirelli | D30/119 |
| 5,988,114 A | 11/1999 | Krietzman et al. | 119/706 |
| D420,472 S | 2/2000 | Dellasandro et al. | D30/119 |
| 6,052,918 A * | 4/2000 | Oletzke | 211/119.004 |
| D437,979 S | 2/2001 | Lian | D30/119 |
| 6,269,774 B1 | 8/2001 | Stewart | 119/430 |
| 6,619,236 B1 * | 9/2003 | Johnakin, III | 119/468 |
| D483,157 S * | 12/2003 | Yang | D30/119 |
| 2004/0025800 A1 | 2/2004 | Carleson et al. | 119/468 |

* cited by examiner

*Primary Examiner*—Teri Pham Luu
*Assistant Examiner*—Elizabeth Shaw
(74) *Attorney, Agent, or Firm*—Alfred M. Walker

(57) ABSTRACT

A door suspended bird perch includes an overhang over a door. An optional clamp tightens the bird support perch bar in any desirable position. The perch is positioned parallel to, the door, so that the door surface is at the bird's back, which is less confirming visually to the bird. The perch can be moved adjustably outward away from the door. The angle of the perch away from the door can be adjustable as well. A gripping surface is provided upon which the bird can cling or sharpen its claws. Optionally, the perch can be folded flat against the door when stored and not used. In further options the bird perch may have optional food and bowls and/or a litter catch.

12 Claims, 5 Drawing Sheets

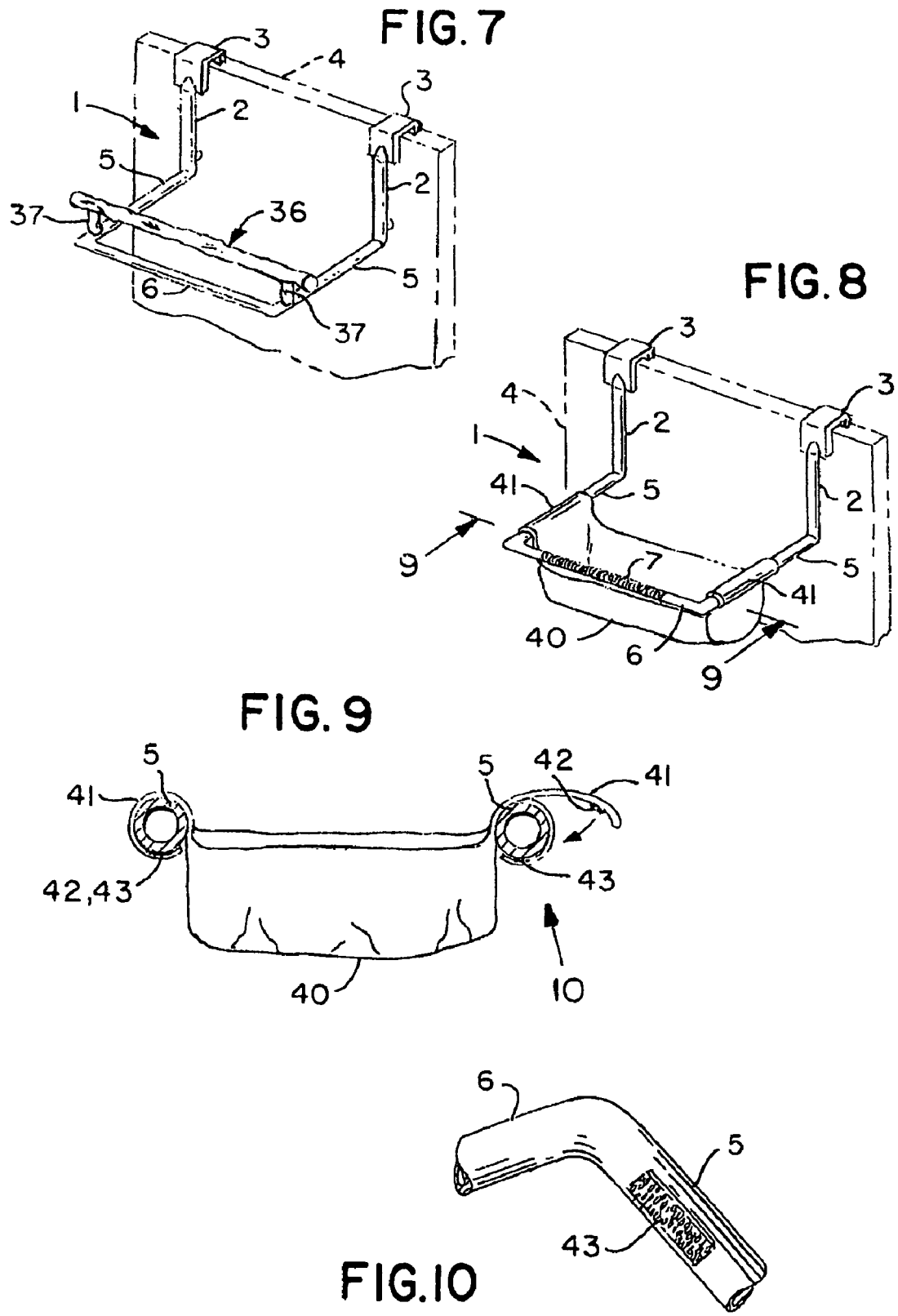

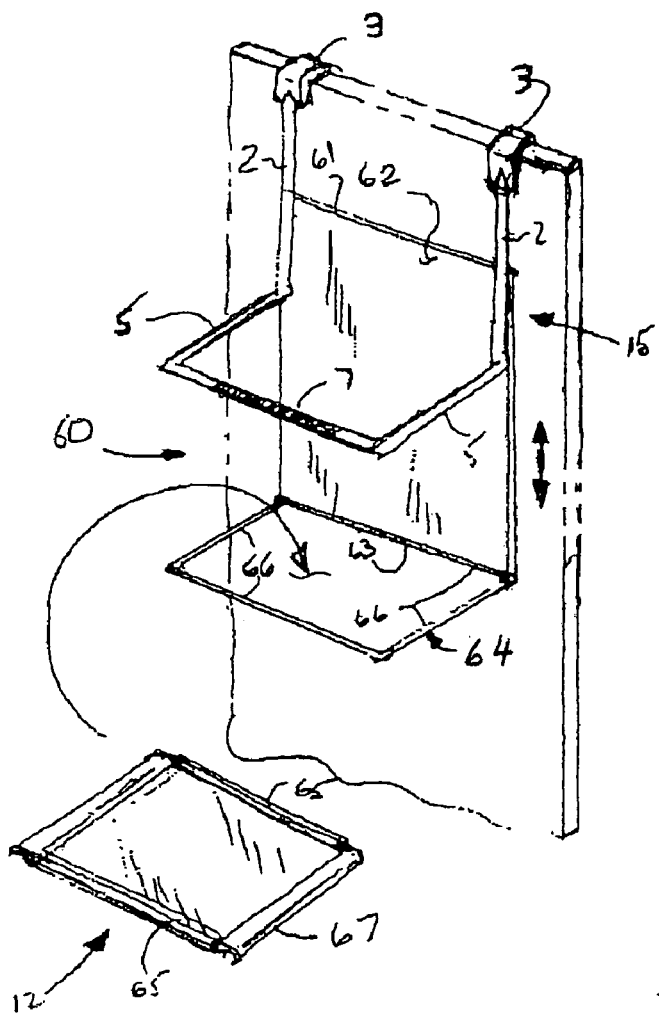
FIG.14
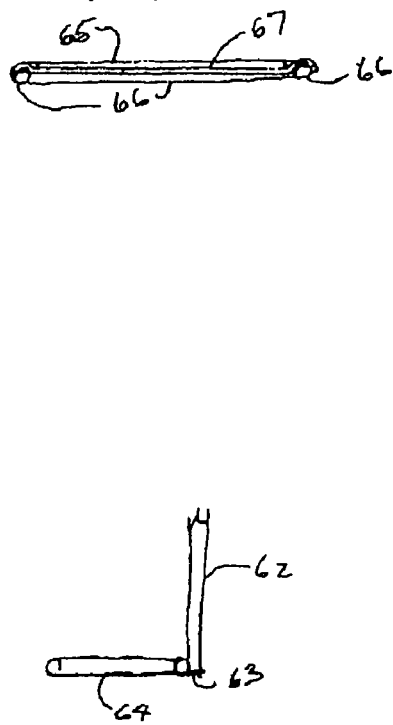
FIG.15
FIG.17
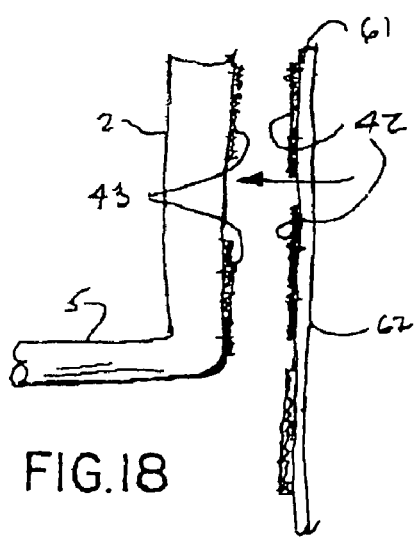
FIG.16
FIG.18

DOOR SUSPENDED OUTWARD FACING BIRD PERCH

FIELD OF THE INVENTION

The present invention relates to a door suspended outward facing bird perch.

BACKGROUND OF THE INVENTION

Among related patents include U.S. Pat. No. Des 414,901 of Cirelli, which discloses a temporary bird perch which clamps on to a shower door. However, Cirelli '901 does not describe a bird perch which is suspended from a door, wherein the horizontal perch bar is spaced apart from a door and is positioned parallel to a door, so that a bird perched thereon has its back to the door.

However, Cirelli's bird perch is not adjustable, and does not disclose the clinging surface. In addition, in Cirelli, the bird is oriented with the nearby door surface close to the side of the bird, in the bird's sideways line of sight vision. This gives the bird a visually confining orientation while positioned upon the perch.

U.S. Pat. No. 5,218,927 of Addams describes a self-standing bird perch.

U.S. Pat. No. 6,269,774 of Stewart discloses a hanging bird perch, but it is part of a planter, which is hung from a wall-mounted hook.

U.S. Design Pat. No. Des 386,384 of Nissim, et al., teaches a ceiling suspended C-shaped perch for a bird. However, the reference actually does not teach the use of a bird perch which is suspended over a door.

U.S. Pat. Nos. Des 400,314 of Nicolai and U.S. Pat. No. 5,632,230 of Dornetta describe self-standing bird perches which rest on the floor. Dornetta '230 also includes a litter tray.

U.S. Pat. No. 4,627,384 of Courteau describes another self-standing bird perch, which includes a pivotable swing extending down from one of its horizontal perch bars. A removable platform is provided at a lower end for catching food splatter or bird droppings. However, the swing extends directly down from the pivotable hooks, so the swing bar is not spaced apart from the vertical axis of the descending support arms, and is therefore useless for placing adjacent to a door.

Thus, the aforementioned US Patents generally teach that either standing bird perches which are not suitable for hanging over a door, due to their supporting bases. Of the suspended bird perches, the C-shaped perch of Nissim '834 does not have an extension to permit it to be hung spaced apart from and over a door. In addition, the perch bar of Cirelli '901 extends out perpendicular from a shower door, requiring the bird to feel confined by the wall adjacent to the perch.

The use of a door-suspended perch in the present invention for birds, where the perch bar is spaced apart and parallel to a door from which it is suspended would be discouraged, if not clearly taught away from the references noted.

Therefore, the use of a door suspended bird perch, as in Applicant's present invention, in conjunction with a textured bar to facilitate claw gripping is not only not suggested, but would be discouraged or taught away by the references noted.

OBJECTS OF THE INVENTION

It is therefore an object of the present invention to provide a door suspended outward-facing bird perch.

It is also an object of the present invention to provide a bird perch where the bird's orientation is outward away from the door, avoiding a situation giving the bird a visually confining orientation while positioned upon the perch.

It is another object of the present invention to provide a bird perch which can be enlarged in size.

It is a further object to provide bird perch with optional feeding bowls and/or a litter catch.

It is yet another object to provide a bird perch which can be folded flat against a door when not in use.

Other objects which become apparent from the following description of the present invention.

SUMMARY OF THE INVENTION

In keeping with these objects and others, which may become apparent, the present invention is a bird perch with an overhang to go over a door. The bird is oriented with its back to the nearby door surface, away from the bird's line of sight vision. This gives the bird a visually unencumbered orientation while positioned upon the perch. In that sense, the perch is oriented parallel to the door, instead of being oriented perpendicular to the door, as in the Cirelli '901 perch. That means that the door surface is at the bird's back, which may be less confining visually to the bird, since bird's have considerable side, as well as forward, vision. The perch can also be moved adjustably outward at different distances away from the door.

Additionally, the angle of the perch away from the door can be adjustable as well.

The bird perch of the present invention enhances the ability of a caged bird to perch freely within a room by incorporating a door-suspended perch, parallel to and spaced apart from a door. The addition of extendable arms greatly enhances the ability to provide a perch for larger birds. Optionally, the bird perch may be provided with feed and for water bowls for the bird.

The use of an optional lockable hinge provides the bird perch with the ability to be moved from an extended position of use away from a door, to a folded flattened position against the door, when not in use.

Preferably, a textured and/or natural appearing gripping surface is provided upon which the bird can cling or sharpen its claws.

The important textured function of the perch bar provides a natural wood-type surface for the bird to grip and exercise its claws against.

In an alternate embodiment, an optional food splatter or bird dropping litter catch tray or collector can be provided. The tray or collector can have optional replaceable liners.

In summary, the door suspended bird perch provides a convenient portable bird perch which can be stored out of the way when not used, and which can provide a bird with an open line of sight when perched thereon.

BRIEF DESCRIPTION OF THE DRAWINGS

The present invention can best be understood in connection with the accompanying drawings. It is noted that the invention is not limited to the precise embodiments shown in drawings, in which:

FIG. 7 is a perspective view of an alternate embodiment for an elevated natural appearing perch bar;

FIG. 8 is a perspective view of a further alternate embodiment with a litter catch;

FIG. 9 is a front elevational view, taken on arrow "9—9" of FIG. 8;

FIG. 10 is an enlarged partial view of the attaching means for the litter catch of FIG. 8;

FIG. 14 is a perspective view of a further alternate embodiment for a bird perch with a frame supporting a litter catch below the perch;

FIG. 15 is a front elevational view of the litter catch shown in FIG. 14;

FIG. 16 is a perspective view of the frame as in FIG. 14;

FIG. 17 is a close-up partial cutaway side elevational view of the litter catch frame, shown attached to a rail extending below the bird perch;

FIG. 18 is a close-up partial cutaway view showing the attachment of the litter catch frame rail attached to the bird perch;

DETAILED DESCRIPTION OF THE INVENTION

The present invention has broad applications for providing an adjustable, door-suspended bird perch with a perch bar provided spaced apart from the door from which it is suspended over an edge thereof. For illustrative purposes only, a preferred mode for the invention is described herein, wherein the bird perch utilizes the door as its support.

Figure 1:
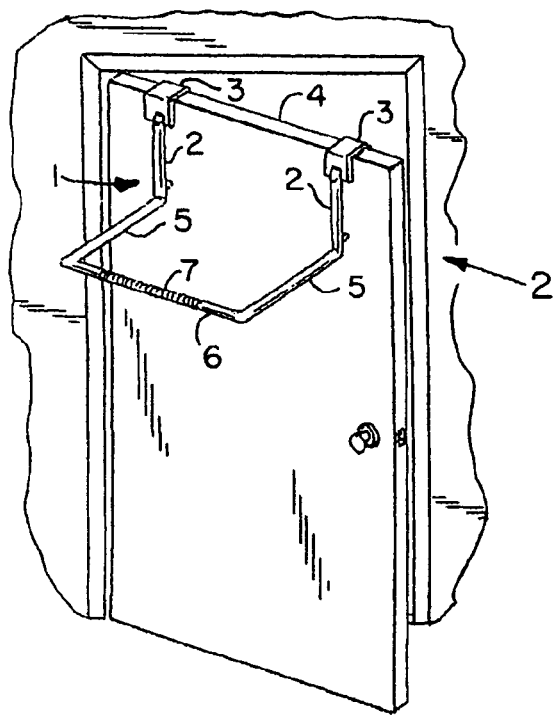
FIG. 1 is a perspective view of the bird perch of the present invention, shown installed over the top of a room door.
Figure 2:
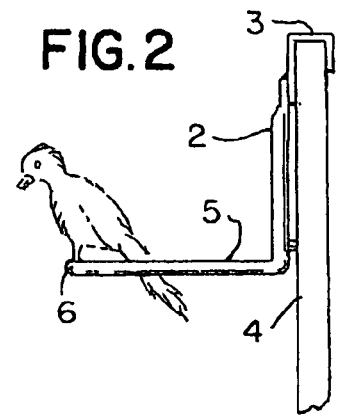
FIG. 2 is a partial right side elevational view, taken along arrow "2" of FIG. 1, showing a bird perched thereon in, for environmental purposes only.

As shown in FIG. 1, bird perch 1 overhangs over a door 4. Perch 1 includes a plurality of vertically descending support bars with respective door hooks 3 at top ends thereof engaging a top edge 4a of door 4. A pair of horizontally extending support arms 5 extend from lower ends of vertically descending support base 2, connected at proximal ends of horizontally extending support arms 5. Connecting support arms 5 at outward, distal ends thereof is a horizontally extending perch bar 6, preferably having a textured, claw-gripping surface thereon. FIG. 2 shows a bird perched thereon.

As shown in FIG. 2 the bird is oriented with the nearby door surface away from the bird's line of sight vision. This gives the bird a visually open orientation while positioned upon perch 1.

Perch bar 6 of perch 1 is parallel to the door 4 instead of perpendicular as in the Cirelli '901 perch. That means in Cirelli '901 the door surface is at the bird's side, which may be confining visually to the bird.

Figure 3:
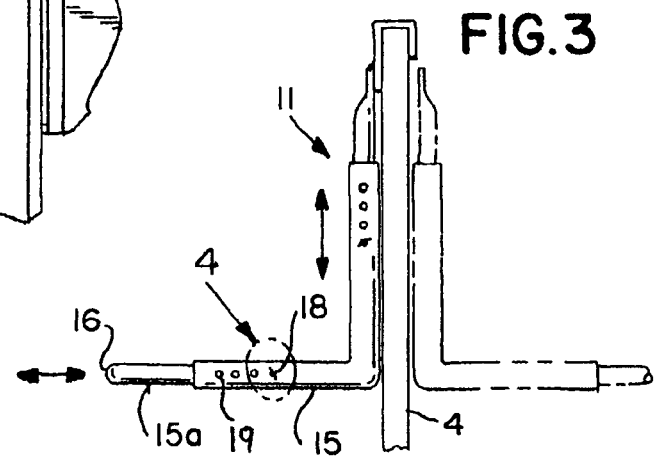
FIG. 3 is a partial right side elevational view, for an alternate adjustable embodiment with extendable arms moving the perch bar toward or away from the door.
Figure 4:
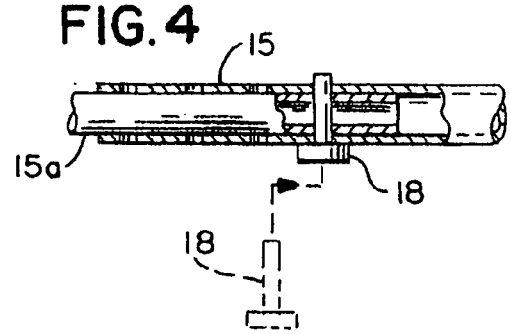
FIG. 4 is a close-up detail side view with the side partially cut away, taken along the ellipse "4" of FIG. 3, showing an adjustment fastener inserted therein.

FIGS. 3 and 4 show an alternate embodiment for perch 11, which includes perch bar 16 which can be moved adjustably outward away from the door 4 by an adjustment fastener, such as a pin 18, insertable in one of a series of holes 19 penetrating support bars 15a and sleeve extenders 15, in either vertical or horizontal directions, as indicated by the bi-directional arrows shown.

Figure 5:
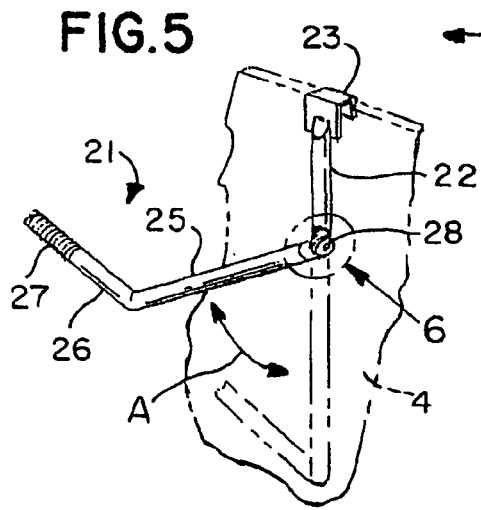
FIG. 5 is a partial perspective view with of an optional single arm bird perch, shown with a further optional spring loaded adjustment fastener, for collapsing the perch flat against a door and adjusting the angle thereof.

FIG. 5 shows an alternate perch 21 having a single vertically descending support arm 25 support a cantilevered outer perch bar 26 having textured gripping surface 27.

Figure 6:
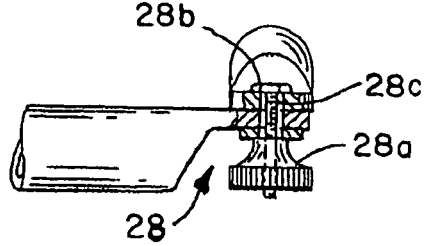
FIG. 6 is a partial cutaway view within an adjustable knob for tightening, taken along the ellipse "6" of FIG. 5; which shows the perch's collapse against a door when stored and not in use.

FIGS. 5 and 6 also show that the angle of the perch away from the door can be adjustable as well by a lockable clamp 28 such as with a tightenable nut 28a having a threaded pair 28b and 28c. Such a locking clamp can also be utilized with a perch having more than one vertically descending support arms, such as support arms 2 shown in FIGS. 1 and 2.

As a result of tightenable clamp 28, perch bar 26 can be moved and locked to any position along arc "A" shown in FIG. 5, and ultimately to a folded, flattened position shown in dotted lines in FIG. 5 against door 4, wherein support arc 25 is parallel to the vertical axis of vertically descending support arm 22 having door hooks 23.

While FIG. 5 shows the angle adjustability feature to vary the angle "A" away from the surface of door 4, in an alternate embodiment, cantilevered perch 21 can be non-adjustable, without fastener 28, with one single non-adjustable vertically descending support arm 25 supporting a cantilevered outer perch bar 26.

FIG. 7 shows an alternate embodiment of a bird perch, having an elevated, natural looking perch 36 elevated above extended support arms 5 and front perch bar 6 via vertical supports 37, wherein perch 1 descends from descending member 2 suspended over a door via hooks 3.

FIGS. 8–10 show a further embodiment of the perch 1 as in FIG. 1 wherein an optional litter catch 40 is attached by wings 41 having attachment members 42 attachable to further attachment members, such as hook and loop fasteners 43 mounted to outwardly extending horizontal bars 5. Litter catch 40 can be made of a flexible washable fabric, or of a disposable synthetic woven or non-woven material. Alternatively, litter catch 40 can be made of a washable, rigid metal or plastic material.

Figure 11:
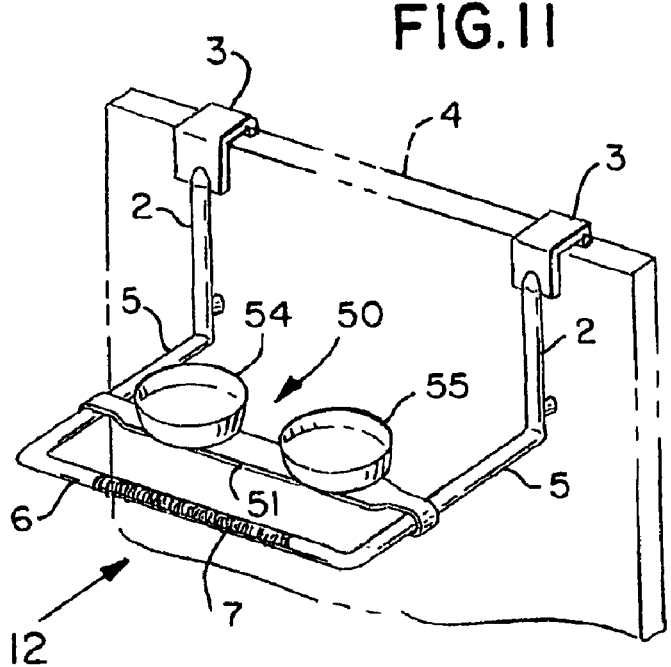
FIG. 11 is a perspective view of one embodiment for a water and feed bowl accessory; for a bird perch.
Figure 12:
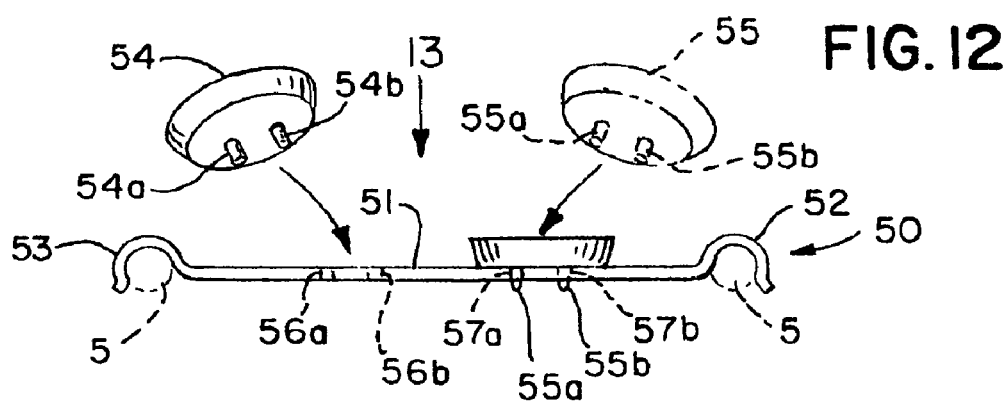
FIG. 12 is a front elevational, partially exploded view thereof, taken along arrow "12" of FIG. 11.
Figure 13:
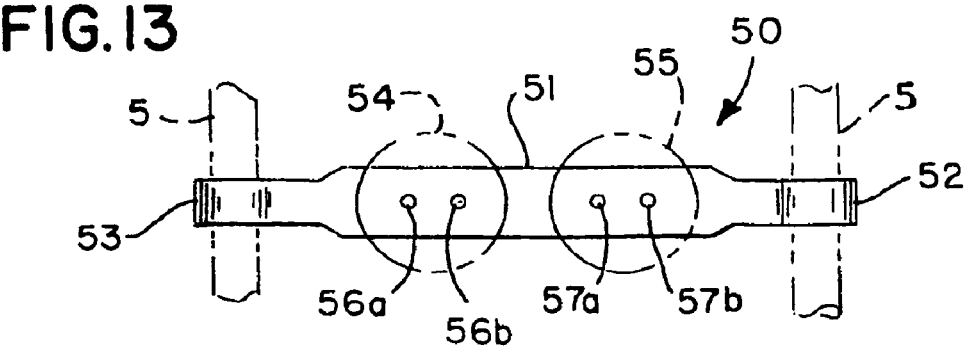
FIG. 13 is a top plan view thereof, taken along arrow "13" of FIG. 12.
Figure 19:
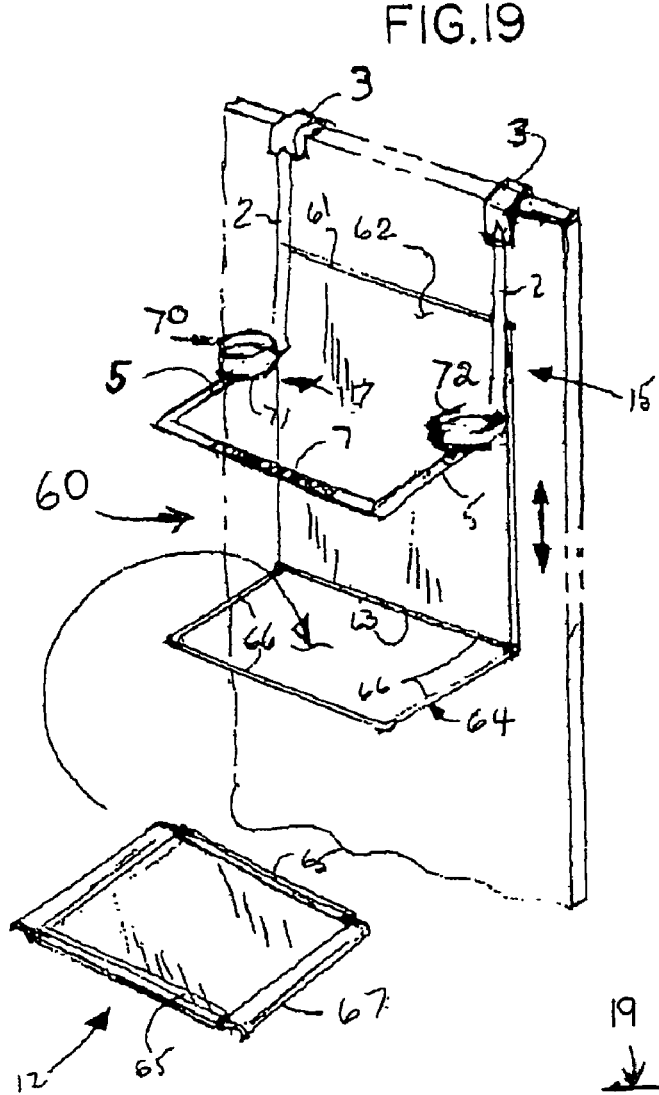
FIG. 19 is a perspective view of the bird perch and litter catch as in FIG. 14, shown with respective feed and water bowls attached thereto.
Figure 20:
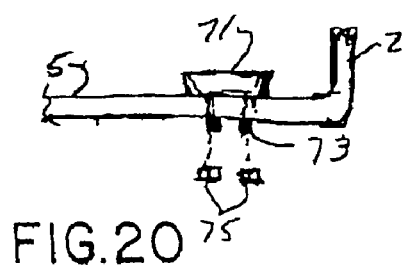
FIG. 20 is a close-up side elevational view in partial crossectional cutaway of the bowl-accommodating portion of the bird perch.

FIG. 11 shows an optional bird water and feed tray 50 having water and feed bowls 54 and 55 removably attached to spanning tray frame 51, which includes hooks 52 and 53 removably attachable over outwardly extending horizontal support arms 5. Although bowls 54 and 55 can be presented affixed to spanning tray frame 51, FIGS. 12 and 13 show bowls 54 and 55 having respective prongs 54a, 54b, and 55a, 55b, insertable into aperture holes 56a, 56b and 57a, 57b within spanning tray frame 51.

As shown in FIGS. 14–22, removable litter catch trays 65 having hooked sides 67 are temporarily suspended over lower frame 60 having frame elements 63, 64, 66. Moreover, lower frame 60 may be attached by fasteners 42, 43, such as, for example, VELCRO® hook and loop fasteners or other suitable fasteners.

Litter catch 65 can also be made of a flexible washable fabric, or of a disposable synthetic woven or non-woven material. Alternatively, litter catch 40 can be made of a washable, rigid metal or plastic material.

Figure 21:
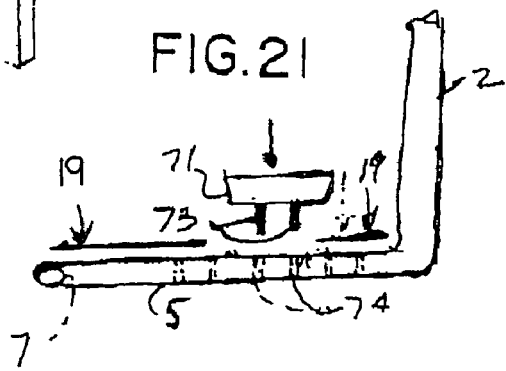
FIG. 21 is an exploded close-up view thereof.
Figure 22:
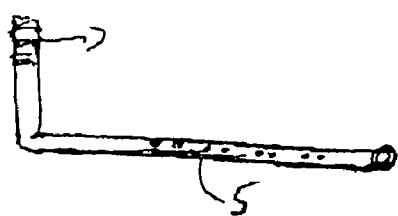
FIG. 22 is a close-up partial cutaway top plan view of the bird perch as in FIGS. 19–21.

As further shown in FIGS. 19–22, bowls 70, 72 may be positioned away from a bird perched thereon, by being optionally rearwardly attached to outwardly extended horizontal support arms 5 by fasteners, such as with threaded prongs 73 having threaded nuts 75, or by fasteners such as prongs 73, shown in FIG. 21 insertable within receptacles 74 within extender arms 5, away from front perch bar 7.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

I claim:

1. A method of combining a pet bird, a bird perch and a door comprising the steps of providing a pet bird and providing a horizontally extending bird support perch bar supported by an overhang assembly extending over a top edge of a door and suspending said pet bird and said perch in a spaced apart relationship away from and parallel to a surface of said door;

supporting said pet bird upon said horizontally extending bird support perch bar so that said pet bird is oriented sitting upon said horizontally extending bird support perch bar, with a nearby door surface being behind and away from said pet bird, positioning said pet bird upon said bird support perch bar so that said nearby door surface is positioned behind and away from said pet bird's line of sight vision, while said pet bird is positioned upon said horizontally extending bird support perch bar; and, locating said horizontally extending perch bar a predetermined distance spaced apart from, and parallel to, said door, wherein said nearby door surface is at said pet bird's back.

2. The method as in claim 1 wherein said horizontally extending bird support perch bar is moved adjustably outward away from the door.

3. The method as in claim 1 further comprising the step of providing a gripping surface upon which said pet bird can cling and/or sharpen its claws.

4. The method as in claim 1 further comprising the step of attaching at least one feed bowl to said perch.

5. The method as in claim 4 further comprising the step of removably attaching said at least one feed bowl to said bird perch.

6. The method as in claim 1 further comprising the step of attaching at least one water bowl to said perch.

7. The method as in claim 6 further comprising the step of removably attaching said at least one water bowl to said bird perch.

8. The method as in claim 1 further comprising the step of supporting said perch bar with at least one hook having a downwardly extending extension member extending between said hook and at least one horizontally extending member positioning said perch bar in a spatial relationship away from the door.

9. The method as in claim 1 further comprising the step of supporting said perch bar with a plurality of hooks, each said hook having a respective downwardly extending extension member extending between each said hook and a respective horizontally extending member positioning said perch bar in a spatial relationship away from the door.

10. A bird perch comprising a horizontally extending bird support perch bar supported by an overhang assembly engagable over a top edge of a door;

said horizontally extending bird support perch bar supporting the bird so that the bird is oriented with the nearby door surface being behind and away from the bird, said bird support perch bar being positioned so that the nearby door surface is positioned behind and away from the bird's line of sight vision, while the bird is positioned upon said horizontally extending bird support perch bar;

said horizontally extending perch bar being located spaced apart from, and parallel to, the door, wherein the door surface is at the bird's back; wherein a predetermined angle of said perch away from the door is adjustable.

11. A bird perch comprising a horizontally extending bird support perch bar supported by an overhang assembly engagable over a top edge of a door;

said horizontally extending bird support perch bar supporting the bird so that the bird is oriented with the nearby door surface being behind and away from the bird, said bird support perch bar being positioned so that the nearby door surface is positioned behind and away from the bird's line of sight vision, while the bird is positioned upon said horizontally extending bird support perch bar;

said horizontally extending perch bar being located spaced apart from, and parallel to, the door, wherein the door surface is at the bird's back; further comprising a litter catch attached to said perch.

12. The bird perch as in claim 11 wherein said litter catch is removably attached to said bird perch.

* * * * *